US011985218B2

United States Patent
Paikaray et al.

(10) Patent No.: US 11,985,218 B2
(45) Date of Patent: May 14, 2024

(54) MEDIA CLOCK RECOVERY AND TRIGGER

(71) Applicant: Harman International Industries, Incorporated, Stamford, CT (US)

(72) Inventors: Rabindra Kumar Paikaray, Karnataka (IN); Yogesh Devidas Dusane, Maharashtra (IN); Hari Krishna Valluru, Karnataka (IN); Chaitra Peddireddy Narayana Reddy, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 14 days.

(21) Appl. No.: 17/822,703

(22) Filed: Aug. 26, 2022

(65) Prior Publication Data

US 2023/0069803 A1   Mar. 2, 2023

Related U.S. Application Data

(60) Provisional application No. 63/260,672, filed on Aug. 27, 2021.

(51) Int. Cl.
*H04L 7/00* (2006.01)
*H04J 3/06* (2006.01)

(52) U.S. Cl.
CPC .......... *H04L 7/0008* (2013.01); *H04J 3/0638* (2013.01); *H04L 7/0016* (2013.01)

(58) Field of Classification Search
CPC ..... H04L 7/0008; H04L 7/0016; H04J 3/0638
See application file for complete search history.

(56) References Cited

U.S. PATENT DOCUMENTS

| | | | | |
|---|---|---|---|---|
| 9,723,580 | B2* | 8/2017 | Boehlke | H04R 5/04 |
| 10,084,559 | B1* | 9/2018 | Devineni | H04J 3/0661 |
| 10,999,479 | B1* | 5/2021 | Igarashi | H04N 21/242 |
| 2013/0003757 | A1* | 1/2013 | Boatright | H04N 21/4381 |
| | | | | 370/474 |
| 2016/0164795 | A1* | 6/2016 | Kuwelkar | H04L 65/60 |
| | | | | 370/253 |
| 2016/0182176 | A1* | 6/2016 | Ramachandra | H04J 3/0661 |
| | | | | 370/429 |

(Continued)

OTHER PUBLICATIONS

"IEEE Standard for a Precision Clock Synchronization Protocol for Networked Measurement and Control Systems," IEEE Instrumentation and Measurement Society, IEEE Std 1588-2008 (Revision of IEEE Std 1588-2002), Jul. 24, 2008, 289 pages.

(Continued)

*Primary Examiner* — Bailor C Hsu
(74) *Attorney, Agent, or Firm* — McCoy Russell LLP

(57) ABSTRACT

Systems and methods are provided for master media clock recovery. In various embodiments, recovering a master media clock may comprise receiving clock reference format (CRF) packets carrying timestamps (Ts). Differences of Ts between adjacent CRF packets may be calculated, and an average difference of Ts between adjacent timestamps may be calculated. A recovered frequency of a master clock may be based on the calculated average difference of Ts between adjacent timestamps. The recovered frequency may be used to regulate a timing of, for example, a kernel module and/or a media application.

20 Claims, 8 Drawing Sheets

(56) References Cited

U.S. PATENT DOCUMENTS

2021/0075936 A1* 3/2021 Matsumura ............. H04N 5/44
2022/0013149 A1* 1/2022 Rentschler ............. H03K 19/20

OTHER PUBLICATIONS

"P1277-2016TM-Cor1/D0 Draft Standard for a Transport Protocol for Time-Sensitive Applications in Bridged Local Area Networks—Corrigendum 1," Microprocessor Standards Committee of the IEEE Computer Society, Jun. 2016, 11 pages.

"IEEE P802.1AS-Rev/D8.0 Draft Standard for Local and Metropolitan Area Networks—Timing and Synchronization for Time-Sensitive Applications," LAN/MAN Standard Committee of the IEEE Computer Society, Prepared by the Time-Sensitive Networking Task Group of IEEE 802.1, Jan. 16, 2019, 447 pages.

* cited by examiner

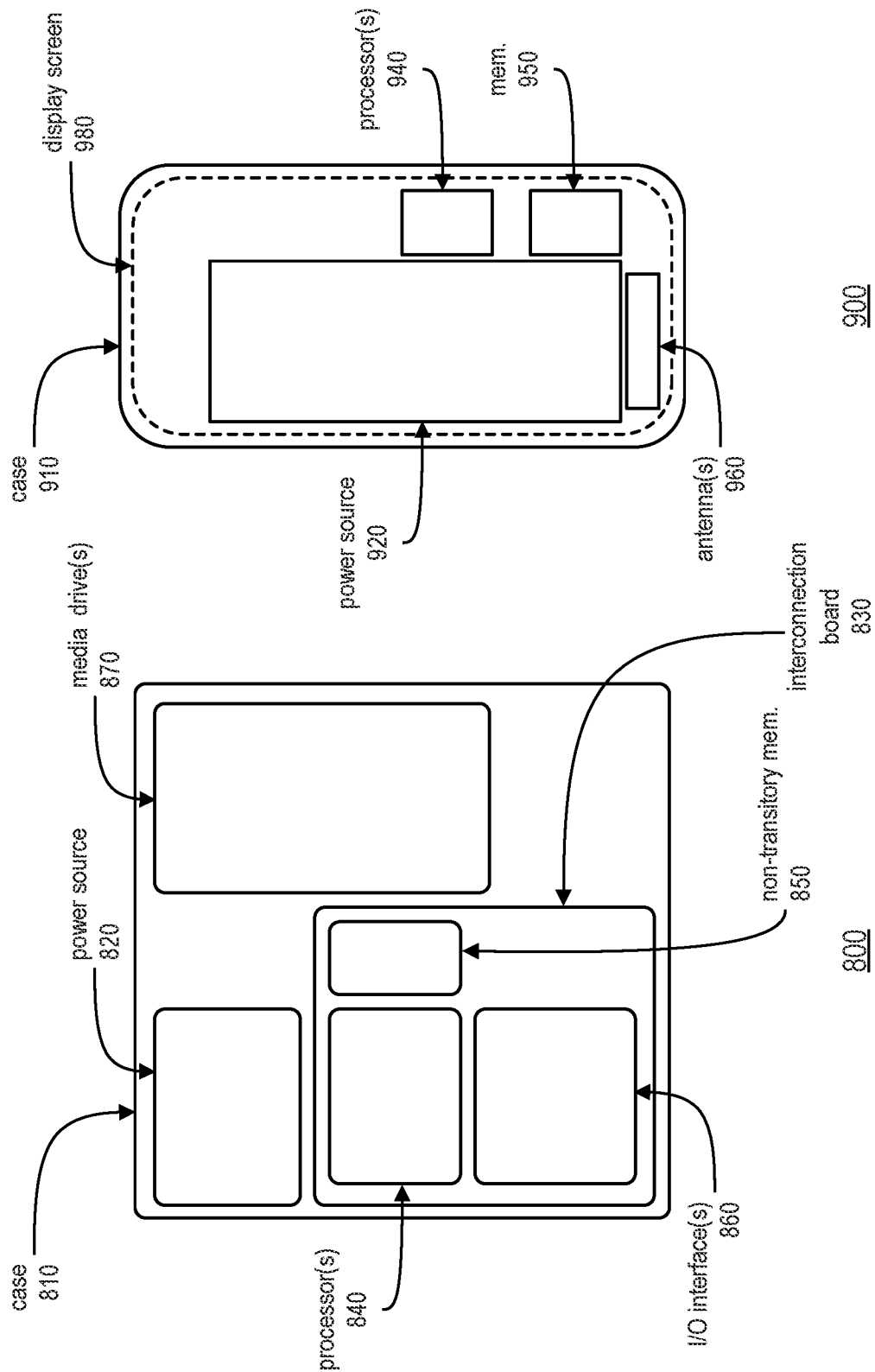

MEDIA CLOCK RECOVERY AND TRIGGER

CROSS REFERENCE TO RELATED APPLICATIONS

The present application claims priority to U.S. Provisional Application No. 63/260,672, entitled "MEDIA CLOCK RECOVERY AND TRIGGER", and filed on Aug. 27, 2021. The entire contents of the above-listed application are hereby incorporated by reference for all purposes.

TECHNICAL FIELD

The disclosure relates to systems and methods for media streams and, in particular, to the recovery of a media clock from time-stamped packets in media streams.

BACKGROUND/SUMMARY

Audio/video media streams may be transmitted from a transmitter to a receiver. A clock or counter at the receiver may be synchronized with a clock or counter at the transmitter through a clock synchronization protocol. Examples of clock synchronization protocols include IEEE (Institute of Electrical and Electronics Engineers) 1722-2016 Standard for a Transport Protocol for Time-Sensitive Applications in Bridged Local Area Networks, IEEE 1588:2002 Standard for a Precision Clock Synchronization Protocol for Networked Measurement and Control Systems, and IEEE 802.1AS Precision Time Protocol (PTP) in IEEE 802.1AS Standard for Local and Metropolitan Area Networks—Timing and Synchronization for Time-Sensitive Applications in Bridged Local Area Networks.

The clock synchronization protocol may include a protocol for exchanging messages between nodes to synchronize the clock at the receiver with the clock at the transmitter or with a clock at some other node. For example, PTP nodes may exchange Ethernet messages that synchronize the PTP nodes to a common time reference by providing clock master selection and negotiation mechanisms, link delay measurement and compensation, and clock rate matching and adjustment mechanisms.

Mechanisms and methods are provided herein for a software based mechanism for media clock recovery and media clock trigger, such as in an Ethernet audio/video bridging (AVB) slave device configured to synchronize a master media clock device to consume audio samples over an Ethernet network system. The embodiments described herein may provide a cost-effective solution suitable for various operating systems, including Linux and Android, with minimal hardware support.

In various embodiments, systems and methods for master media clock recovery may comprise receiving a stream of clock reference format (CRF) packets carrying timestamps. Differences between the timestamps of adjacent CRF packets within the stream may be calculated, and an average of the differences between the timestamps may be assessed. In one example, adjacent CRF packets may include a first CRF packet and a second CRF packet, wherein the second CRF packet is received subsequent or directly preceding the first CRF packet. A frequency of a master media clock may be recovered based on the calculated average difference of timestamps. In this way, a software-based recovery of a master media clock may advantageously avoid relatively more expensive hardware-based implementations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 8 shows a system for recovering a master media clock, in accordance with one or more embodiments of the present disclosure; and FIG. 9 shows a system for recovering a master media clock, in accordance with one or more embodiments of the present disclosure.

DETAILED DESCRIPTION OF THE DRAWINGS

Figure 1:
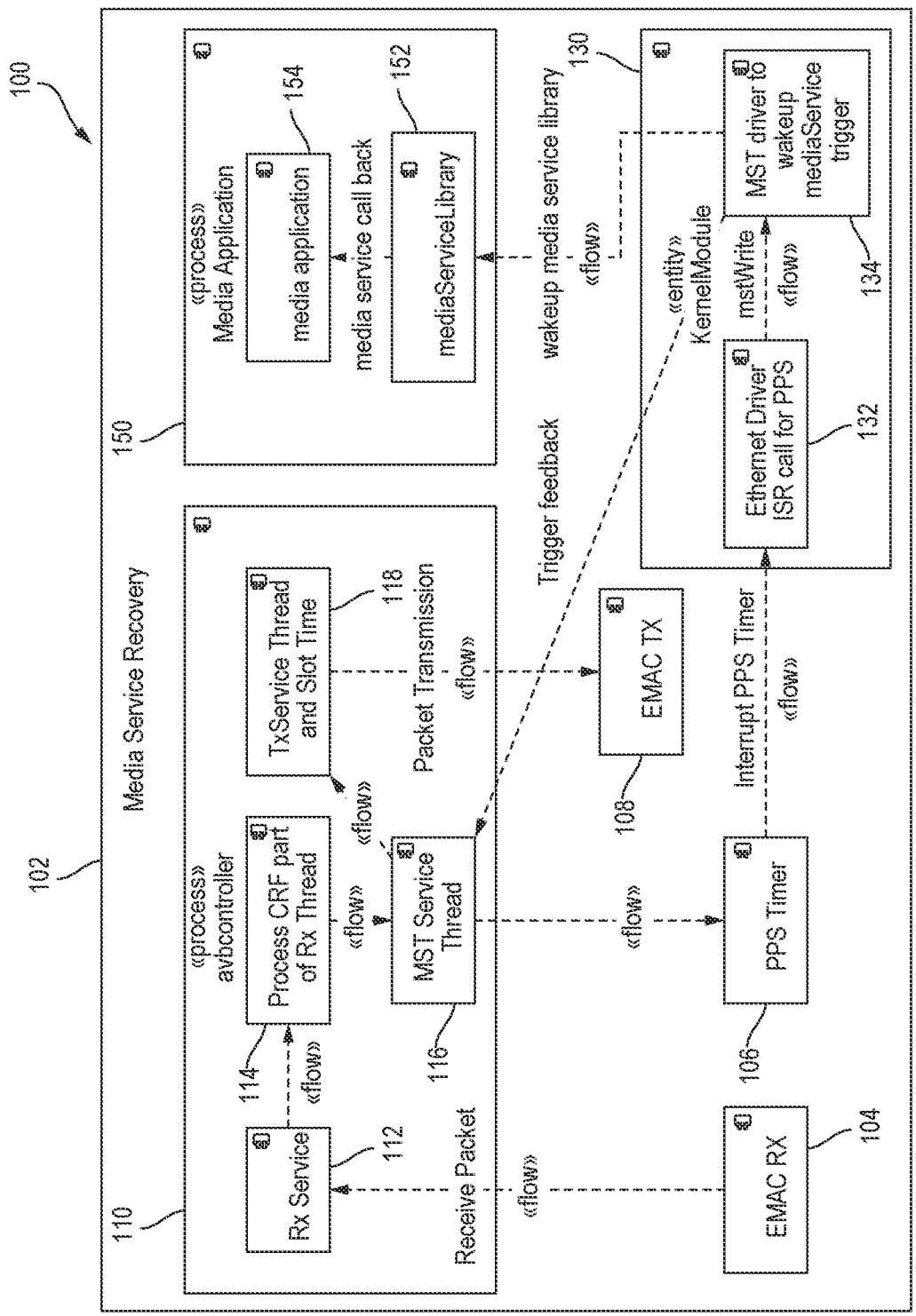
FIG. 1 shows a schematic diagram illustrating a software based media clock recovery system, in accordance with one or more embodiments of the present disclosure.

The present disclosure relates to a software based mechanism for media clock recovery and media clock trigger in an Ethernet audio/video bridging (AVB) slave device to synchronize a master media clock device to consume audio samples over an Ethernet network system. The software based mechanism provides a more cost-effective solution which may be suitable for Linux and/or Android like operating systems (OSes) with minimal hardware support. The present disclosure provides a scalable and flexible platform for implementing a software based media clock trigger for distributed audio video streaming in an AVB network which may support multiple media clock slave devices and one media clock master device, which may advantageously help achieve a cost effective media clock synchronization and media clock trigger implementation.

In various embodiments, a media service trigger synchronization between a media clock master (e.g., a media clock master device) and an AVB controller may be achieved using a stream of clock reference format (CRF) packets, e.g., a CRF stream. A CRF packet may be a special internet packet, such as an Ethernet 1722 packet, distributed over an AVB network. A payload of a CRF packet may include a timestamp, such as an audio video transport protocol (AVTP) Timestamp (Ts). The CRF stream may accordingly provide a media clock master frequency, in the form of a stream of timestamps (e.g., Ts), with low overhead. In various embodiments, a CRF stream might not include any media data, and may merely include clock-edge timestamps that occurred since a last CRF frame was transmitted (e.g., a number of clock-edge timestamps).

Relative to a clock of a media master device (which may be a device streaming media content), a clock of a device consuming output from the media master device may be faster or slower. The software-based methods and mechanisms disclosed herein may observe a number of packets (e.g., CRF packets), may calculate differences between timestamps (e.g., Ts) of adjacent packets (e.g., CRF packets that immediately precede and/or immediately follow each other, or are adjacent to each other in time), and may calculate an average difference between the timestamps of such packets.

On occasion, the differences between adjacent timestamps may deviate substantially from a typical difference. The methods and mechanisms disclosed herein may advantageously smooth variances due to such individual differences between adjacent timestamps, and may advantageously address occasional outliers or excursions in individual differences between adjacent timestamps.

When initialized, the methods and mechanisms disclosed herein may wait until a minimum number of packets are received (e.g., by a device consuming output from the media master device) to begin calculating the average differences. In various embodiments, the minimum number of packets may be a predetermined number that may advantageously reduce and/or eliminate distortion in streaming audio, such as by minimizing errors in calculating a clock frequency of the media clock master (e.g., a media clock master device), for example as a function of timestamps. In some embodiments, the minimum number of packets may be 8 packets, or 16 packets, or 32 packets, or 64 packets, or another number of packets expressed as a power of two. For some embodiments, the minimum number of packets may be 1024 packets.

With reference to FIG. 1, a software based media clock recovery system 100, which may include a media service recovery architecture 102, is shown. The software based media clock recovery system 100 may be a non-limiting example of an Ethernet audio/video bridging slave device, in one example. The media service recovery architecture 102 may comprise an Ethernet Media Access Controller (EMAC) Rx 104, a PPS timer 106, an AVB controller 110, an EMAC Tx 108, a kernel module 130, and a media application 150. In one example, each controller and/or controllers introduced herein may be a non-limiting example of a processor including non-transitory memory with instructions stored thereon that when executed enable the processor to execute one or more steps for the software based media clock recovery system 100, as will be described in greater detail herein.

EMAC Rx 104 may send a receive packet to an Rx (e.g., receive) service 112 of the AVB controller 110, which may be in communication with a process CRF part of Rx thread 114 of the AVB controller 110. At the AVB controller, the receive packet (and/or other flow control) may be sent to the process CRF part of Rx thread 114. The process CRF part of Rx thread 114 may send the receive packet (and/or other flow control) to an MST service thread 116 of the AVB controller 110. The MST service thread 116 may send the receive packet (and/or other flow control) to one or more of the PPS timer 106 (which may comprise, e.g., one or more hardware registers) and a Tx (e.g., transmit) service thread and slot time 118 of the AVB controller 110. The Tx service thread and slot time 118 may send a packet transmission (and/or other flow control) to the EMAC Tx 108.

The PPS timer 106 may send an interrupt PPS timer to an Ethernet driver ISR (e.g., Internet Service Routine) call for PPS 132 of the kernel module 130.

The Ethernet driver ISR call for PPS 132 may send an mstWrite to an MST driver to wakeup media service trigger 134 of the kernel module 130. The MST driver to wakeup media service trigger 134 may send a trigger feedback to the MST service thread 116 of the AVB controller 110, and may send a wakeup media service library indicator to a media service library module 152 of the media application 150.

The media service library module 152 may send a media service call back to a media application module 154 of the media application 150.

Figure 2:
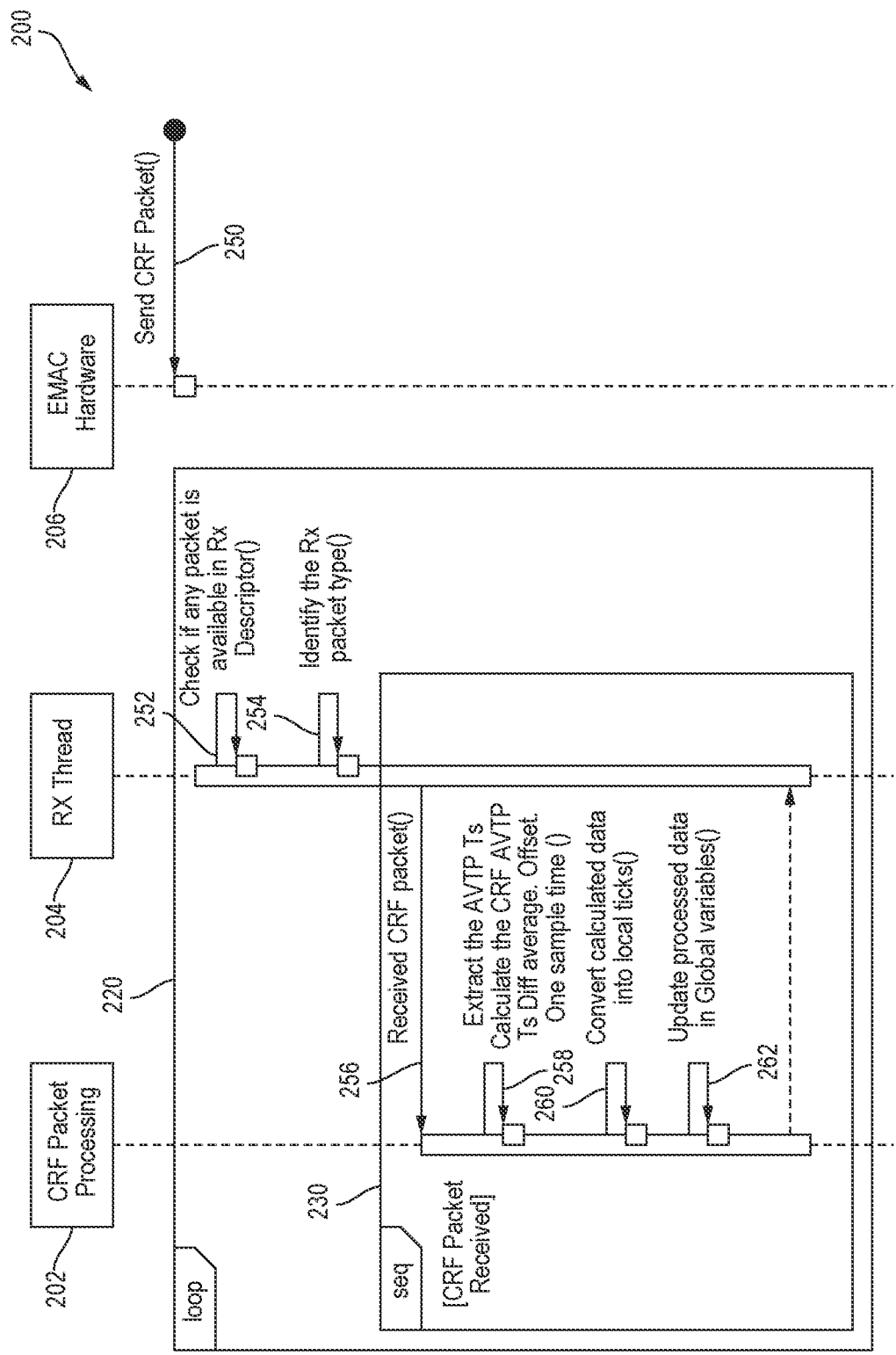
FIG. 2 shows a clock reference format (CRF) packet processing protocol, in accordance with one or more embodiments of the present disclosure.

Turning now to FIG. 2, a CRF packet processing protocol 200 (which may be part of a media clock recovery protocol) is shown. A CRF packet processing module 202, an Rx thread 204, and an EMAC hardware module 206 may interoperate within the CRF packet processing protocol 200, such as within a loop 220 and/or a sequence 230 of the CRF packet processing protocol 200.

With reference to FIGS. 1 and 2, in various embodiments, a media clock master (e.g., a master clock) may transmit one or more CRF packets with timestamps (e.g., Ts) in response to instructions stored on non-transitory memory of one or more processors being executed. In one example, the master clock is fixed and is the selected master clock during all operating conditions. An AVB controller (e.g., part of the media clock recovery system 100 such as the AVB controller 110), which may be a non-limiting example of a processor including instructions stored on non-transitory memory, may receive a plurality of CRF packets and extract the timestamps (e.g., CRF timestamps and/or CRF Ts). In accordance with the CRF packet processing protocol 200, an average of a plurality of differences between adjacent CRF timestamps of the plurality of CRF packets may be calculated, and an offset and a sample time may be calculated in PTP and/or a local time domain. In one example, the plurality of CRF packets are part of a CRF stream.

At 250, a CRF packet may be sent to the EMAC hardware module 206.

In the loop 220, at 252, the Rx thread 204 may check if any packet is available in an Rx descriptor.

At 254, the Rx thread 204 may identify a packet type (e.g., of an available packet).

In the sequence 230 (which may pertain to one or more CRF packets being received), at 256, the CRF packet processing module 202 may receive a CRF packet from the Rx thread 204 (which may result in a CRF Packet received condition).

At 258, the CRF packet processing module 202 may extract the timestamps and calculate an average difference of timestamps of adjacent CRF packets of the plurality of CRF packets based on the plurality of differences between timestamps of adjacent CRF packets of the plurality of CRF packets, and an offset and a sample time. In one example, the plurality of CRF packets are free of media data. The difference between adjacent timestamps (e.g., CRF Ts) may comprise a number of clock edge timestamps that have occurred between a transmitted CRF frame and a previously-transmitted CRF frame.

At 260, the CRF packet processing module 202 may convert the calculated data into local ticks.

At 262, the CRF packet processing module 202 may update the processed data in one or more global variables, which may bring the sequence 230 and/or the loop 220 to an end.

In one example, additionally or alternatively, the AVB controller may establish a recovered frequency of a master clock based on the calculated average difference of timestamps of adjacent CRF packets (e.g., CRF Ts) of the plurality of CRF packets. The recovered clock frequency may correspond to timestamps that occurred since a previous CRF packet was transmitted. The establishment of the recovered frequency of the master clock is not based upon a phase locked loop (PLL).

In one example, the AVB controller may regulate a timing of a kernel module based on the recovered frequency of the master clock media, a timing of a media application based on the recovered frequency of the master clock media, or both. In one example, regulating the timing of the kernel module may include adjusting the timing of the wakeup media service trigger.

Figure 3:
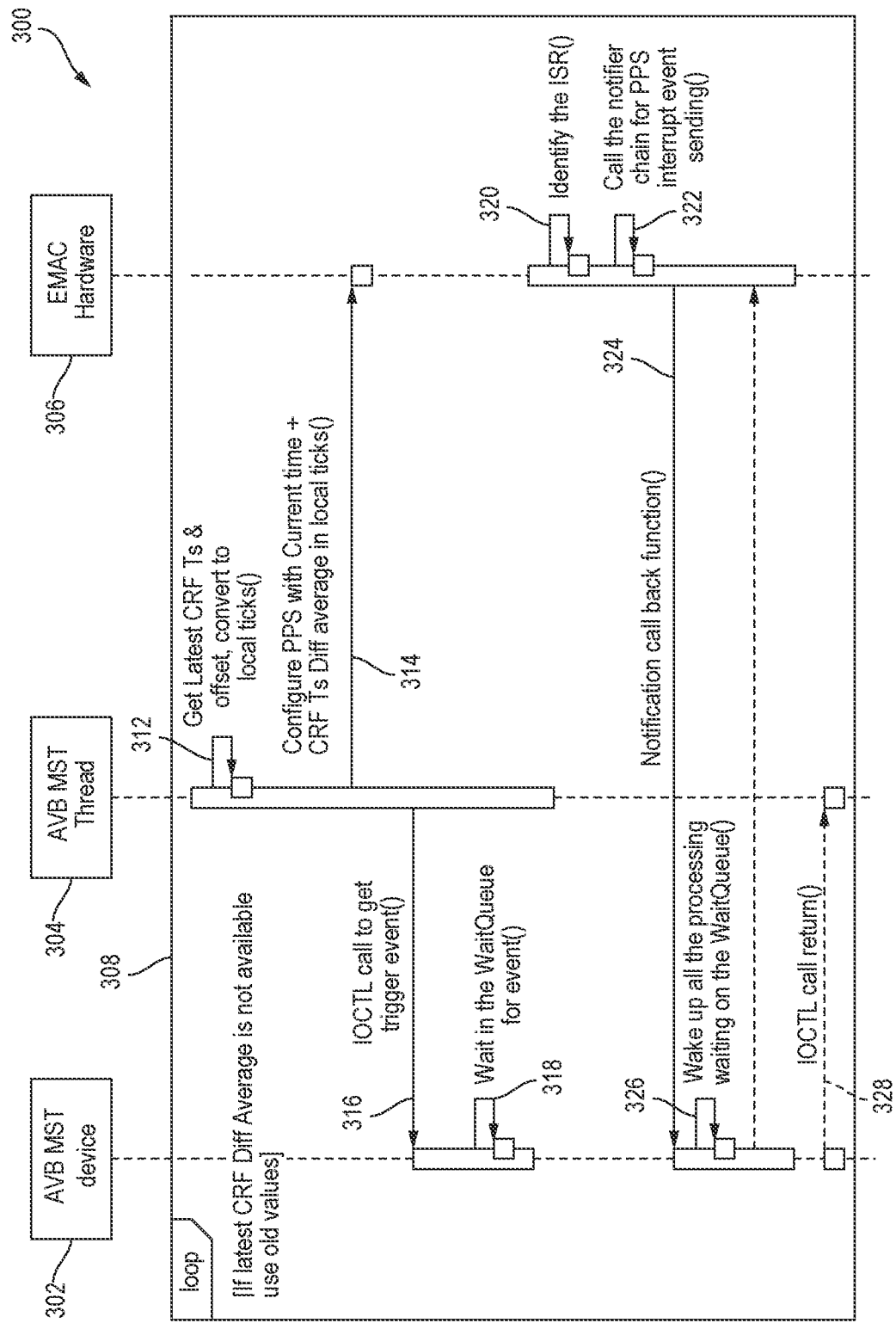
FIG. 3 shows a packets per second (PPS) submodule configuration protocol, in accordance with one or more embodiments of the present disclosure.

Turning now to FIG. 3, a PPS configuration protocol 300 is shown. An AVB Media Service Trigger (MST) device 302 (e.g., an avbmstdev), an AVB MST thread 304, and an EMAC hardware 306 may interoperate within the PPS configuration protocol 300, such as within a loop 308 of the PPS configuration protocol 300.

With reference to FIGS. 1-3, in various embodiments, the PPS configuration protocol 300 may relate to a PPS submodule in EMAC, which can generate an interrupt at a configured system time. This module may be used for generating an interrupt at a rate matching to a media clock master rate using the average of differences between the CRF timestamps (calculated above) with respect to FIG. 2. The PPS configuration system may include a current system time and an average of differences between the CRF timestamps, and may perform an input/output control call (e.g., an AVB MST device IOCTL call). An IOCTL call may be a blocking call, and an unblock may occur once the AVB MST device (e.g., AVB MST device 302) receives a PPS interrupt notification from an EMAC driver. Once the IOCTL call is unblocked again, the PPS module may be configured to generate an interrupt.

In the loop 308, at 312, the AVB MST thread 304 may retrieve the latest CRF timestamps and offset and may convert them to local ticks.

At 314, the AVB MST thread 304 may configure, for the EMAC hardware 306, the PPS with a current time and an average of differences between the CRF timestamps in local ticks. In various embodiments, for the loop 308, if a latest average of differences between the CRF timestamps is unavailable, an old value may be used.

At 316, the AVB MST thread 304 may send an IOCTL call to retrieve a trigger event to the AVB MST device 302.

At 318, the AVB MST device 302 may wait in a wait queue for an event.

At 320, the EMAC hardware 306 may identify an ISR.

At 322, the EMAC hardware 306 may call a notifier chain for PPS interrupt event sending.

At 324, the EMAC hardware 306 may send a notification call back function to the AVB MST device 302.

At 326, the AVB MST device 302 may wake up a portion of the processing waiting in the wait queue, up to and including all of the processing.

At 328, the AVB MST device 302 may send an IOCTL call return to the AVB MST thread 304, which may bring the loop 308 to an end.

Figure 4:
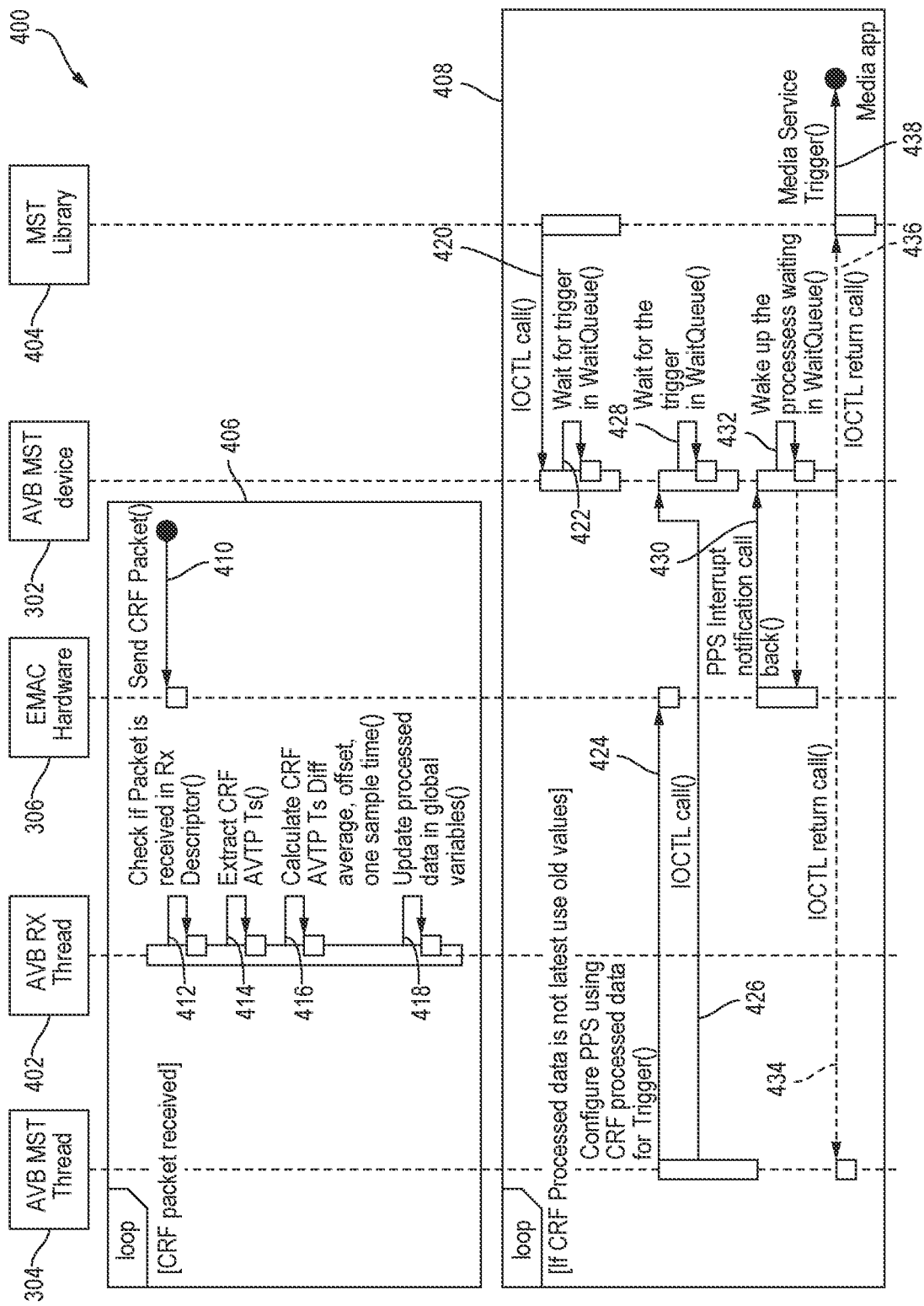
FIG. 4 shows a media service trigger (MST) generation protocol, in accordance with one or more embodiments of the present disclosure.

Turning now to FIG. 4, an MST generation protocol 400 is shown. The AVB MST thread 304, an AVB Rx thread 402, the EMAC hardware 306, the AVB MST device 302, and an MST library 404 may interoperate within the MST generation protocol 400, such as within a loop 406 and/or a loop 408 of the MST generation protocol 400.

With reference to FIGS. 1-4, in various embodiments, an MST may be generated via a PPS module of an EMAC. Upon receiving CRF packets, an average of differences between the CRF timestamps may be calculated, and an offset and a sample time may be calculated in PTP and/or a local time domain. The PPS module may be configured using the calculated average of differences between the CRF timestamps. On receiving every CRF packet, all the values may be recalculated. Once the PPS module is configured and a PPS interrupt event is received, a next PPS interrupt may be configured. Along with an AVB controller (such as AVB controller 110), a media application (such as media application 150) may also receive event notification.

In the loop 406 (which may pertain to a CRF packet having been received), at 410, a CRF packet may be received by the EMAC hardware 306.

At 412, the AVB Rx thread 402 may perform a check to determine whether the CRF packet is received in an Rx Descriptor.

At 414, the AVB Rx thread 402 may extract CRF timestamps.

At 416, the AVB Rx thread 402 may calculate an average of differences between the CRF timestamps, an offset, and one sample time (e.g., in local and/or PTP time domain).

At 418, the AVB Rx thread 402 may update processed data in global variables, which may bring the loop 406 to an end.

In the loop 408, at 420, the MST library 404 may send an IOCTL call to the AVB MST device 302.

At 422, the AVB MST device 302 may wait for a trigger in the wait queue.

At 424, the AVB MST thread 304 may configure the PPS module (e.g., of the EMAC hardware 306) using CRF processed data for trigger, which may include the calculated average of differences between the CRF timestamps. In various embodiments, if CRF processed data is not up to date, old values for CRF processed data may be used.

At 426, the AVB MST thread 304 may send the IOCTL call to the AVB MST device 302.

At 428, the AVB MST device 302 may wait for the trigger in the wait queue.

At 430, the EMAC hardware 306 may send a PPS interrupt notification call back to the AVB MST device 302. In various embodiments, with the PPS interrupt event having been received, the next PPS interrupt may be configured. Some or all of the CRF packets may be received, and some or all of the values may be recalculated.

At 432, the AVB MST device 302 may wake up the processes waiting in the wait queue. In some embodiments, the waking up of the processes may be communicated back to the EMAC hardware 306.

At 434, the AVB MST device 302 may execute the IOCTL return call to the AVB MST thread 304. Similarly, at 436, the AVB MST device 302 may execute the IOCTL return call to the MST library 404.

At 438, the MST library 404 may trigger a media service. In one example, a notification may be sent to the AVB controller (e.g., AVB controller 110) and the media application (e.g., media application 150), which may bring the loop 408 to an end.

Figure 5:
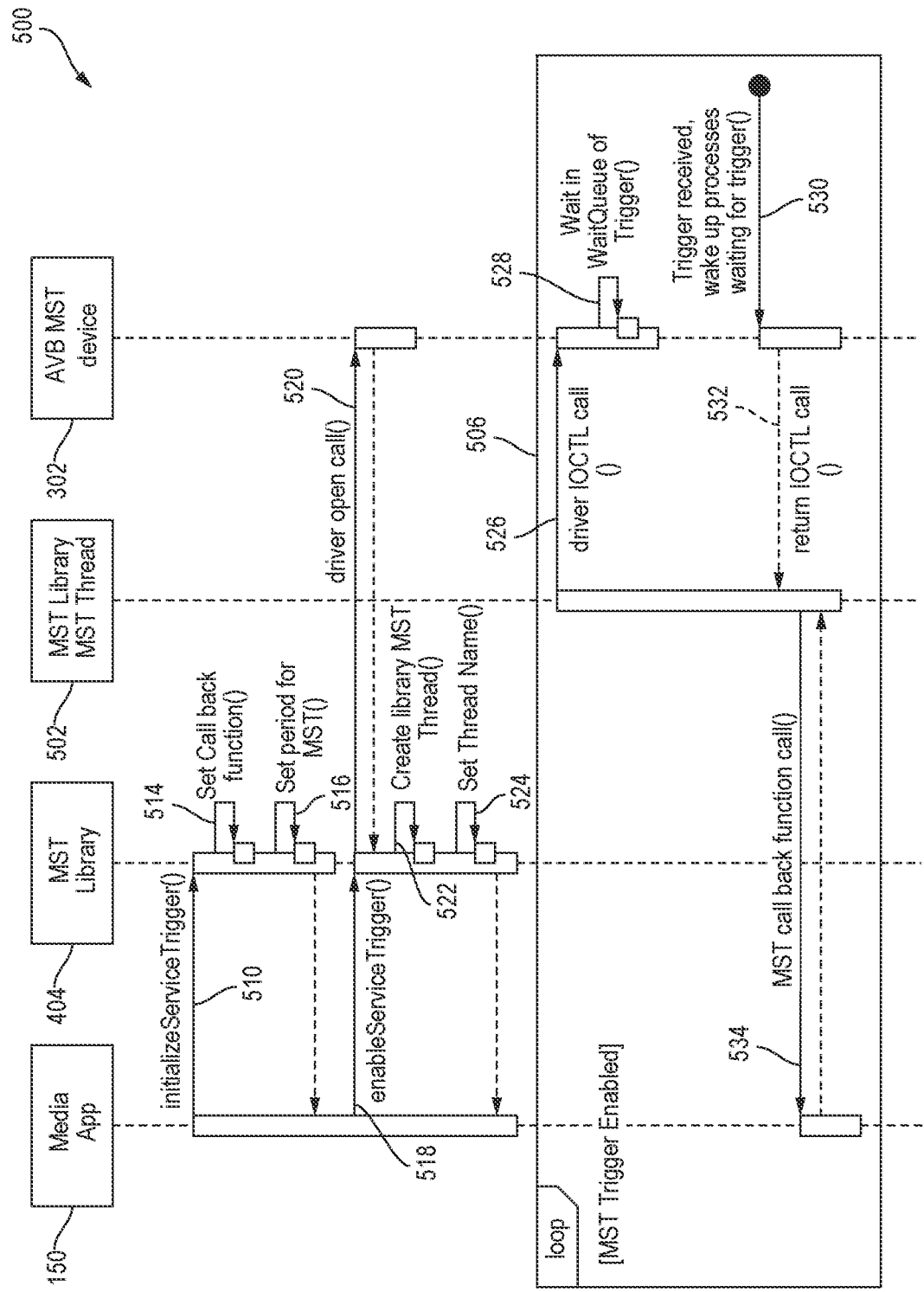
FIG. 5 shows a receiving MST protocol, in accordance with one or more embodiments of the present disclosure.

Turning now to FIG. 5, a receiving MST protocol 500 is shown. The mobile application 150, the MST library 404, an MST library/MST thread 502, and the AVB MST device 302 may interoperate within the receiving MST protocol 500, such as within a loop 506 of the receiving MST protocol 500.

With reference to FIGS. 1-5, in various embodiments, a media application (e.g., the media application 150) which may be disposed to acquiring a media service trigger may be disposed to registering a call back function with an MST Library (e.g., the MST library 404). Inside the MST library thread, a read call may be blocked until a PPS Interrupt notification is received in an AVB MST device driver (e.g., a driver of AVB MST device 302). Once the read call is unblocked, a function subject to call back from the media application registered to the MST library may be called.

At 510, the media application 150 may send an initial service trigger to the MST library 404, which may register a call back function.

At 514, the MST library 404 may set the call back function. Inside the MST library thread, a read call may be blocked until a PPS interrupt notification is received in the AVB MST device 302 (e.g., at 530).

At 516, the MST library 404 may set a period for MST.

At 518, the media application 150 may send an enable service trigger to the MST library 404.

At 520, the MST library 404 may send a driver open call to the AVB MST device 302. In some embodiments, the AVB MST device 302 may respond to the MST library 404 regarding the driver open call.

At 522, the MST library 404 may create a library MST thread.

At 524, the MST library 404 may set a thread name.

In the loop 506 (which may pertain to an MST trigger being enabled), at 526, the MST library/MST thread 502 may send a driver IOCTL call to the AVB MST device 302.

At 528, the AVB MST device 302 may initiate a wait in a wait queue of a trigger (e.g., a trigger event).

At 530, the AVB MST device 302 may receive a trigger is received (e.g., as described above). In various embodiments, the MST library/MST thread 502 read call may be unblocked in response to the PPS interrupt notification (e.g., the trigger) being received by the AVB MST device 302.

At 532, the AVB MST device 302 may return the IOCTL call.

At 534, the MST library/MST thread 502 may send an MST call back function call to the media application 150. Once the call is unblocked, the call back function from the media application (e.g., the media application 150) registered to the MST library (e.g., the MST library 404) may be called, which may bring the loop 506 to an end.

Figure 6:
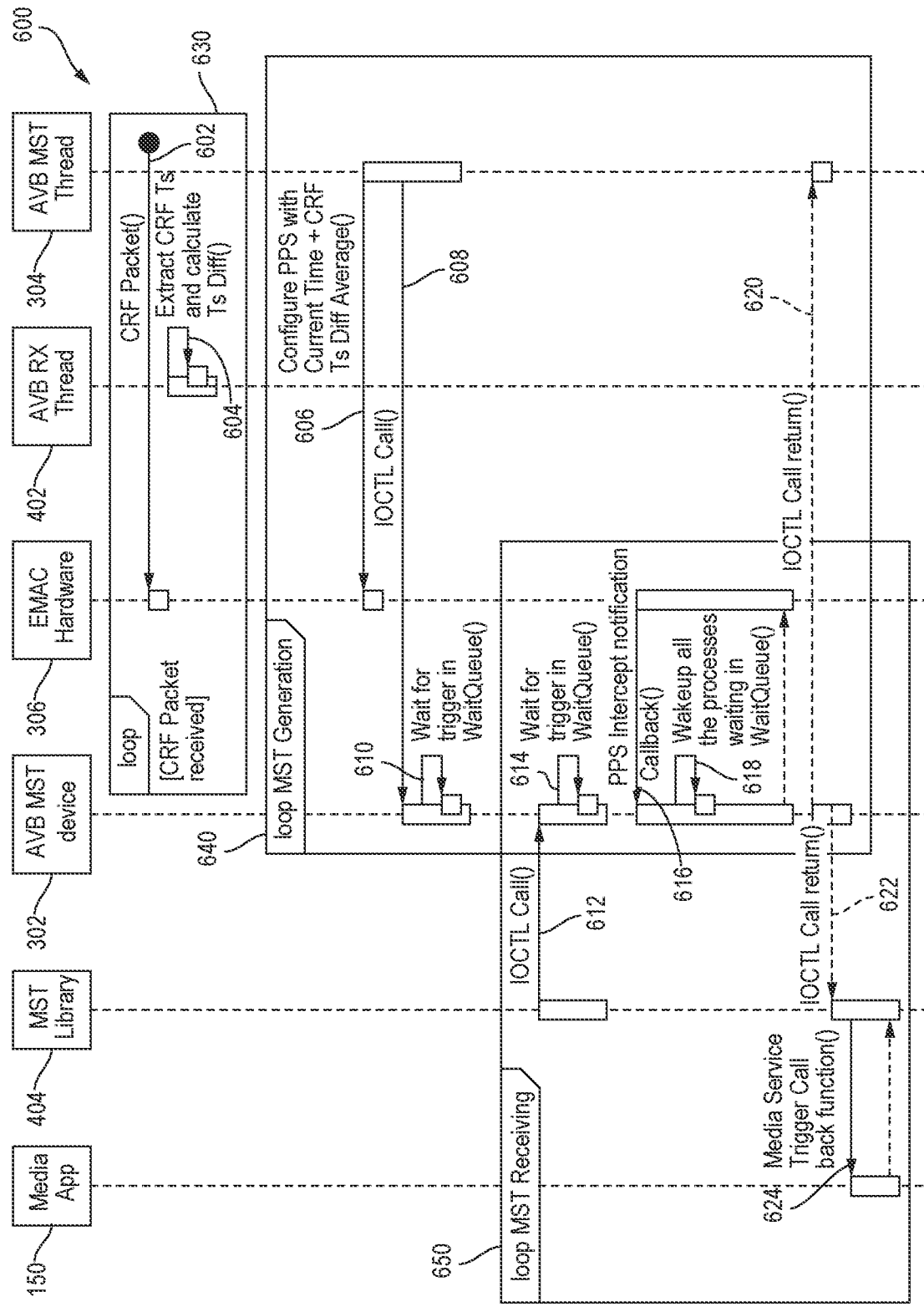
FIG. 6 shows an MST generation and receiving protocol, in accordance with one or more embodiments of the present disclosure.

Turning now to FIG. 6, an MST generation and receiving protocol 600 is shown. The mobile application 150, the MST library 404, the AVB MST device 302, the EMAC hardware 306, the AVB Rx thread 402, and the AVB MST thread 304 may interoperate within the MST generation and receiving protocol 600, such as within a loop 630, an MST generation loop 640, and/or an MST receiving loop 650.

In various embodiments, an MST may be generated by configuring a PPS with media clock data extracted from CRF packets. Media may receive an MST from a library (e.g., an MST library). A media application (e.g., the media application 150) may receive the MST and may register it to the library.

In the loop 630 (which may pertain to a CRF packet being received), at 602, the EMAC hardware 306 may receive the CRF packet.

At 604, the AVB Rx thread 402 may extract CRF timestamps (e.g., CRF Ts) and may calculate the average of differences between the CRF timestamps, an offset, and/or one sample time in local and PTP time domain, which may bring the loop 630 to an end.

In the MST generation loop 640, at 606, the AVB MST thread 304 may configure the PPS module (e.g., of the EMAC hardware 306) is configured with a current time and average of differences between the CRF timestamps.

At 608, the AVB MST thread 304 may send the IOCTL call to the AVB MST device 302.

At 610, the AVB MST thread 304 may initiate a wait for a trigger in a wait queue.

In the MST generation loop 640 and/or the MST receiving loop 650—e.g., in a part of the MST generation and receiving protocol 600 potentially shared by MST generation loop 640 and/or the MST receiving loop 650—at 612, the MST library 404 may send an IOCTL call to the AVB MST device 302.

At 614, the AVB MST device 302 may initiate a wait for a trigger in the wait queue.

At 616, the EMAC hardware 306 may send a PPS interrupt notification callback to the AVB MST device 302.

At 618, the AVB MST device 302 may wake up all processes waiting in the wait queue.

At 620, the AVB MST device 302 may return the IOCTL call to the AVB MST thread 304. Similarly, at 622, the AVB MST device 302 may return the IOCTL call to the MST library 404, which may bring the MST generation loop 640 to an end.

In the MST receiving loop 650, at 624, the MST library 404 may send the media service trigger call back function to the media application 150, which may bring the MST receiving loop 650 to an end.

In this way, a media clock recovery may include software for consumption of a media as a media clock slave. In one example, the media clock recovery is free of a phase-locked loop (PLL) and other hardware based media clock recovery techniques shown in the prior art. The technical effect of the software for the media clock recovery is to provide a cost effective media recovery solution.

Figure 7:
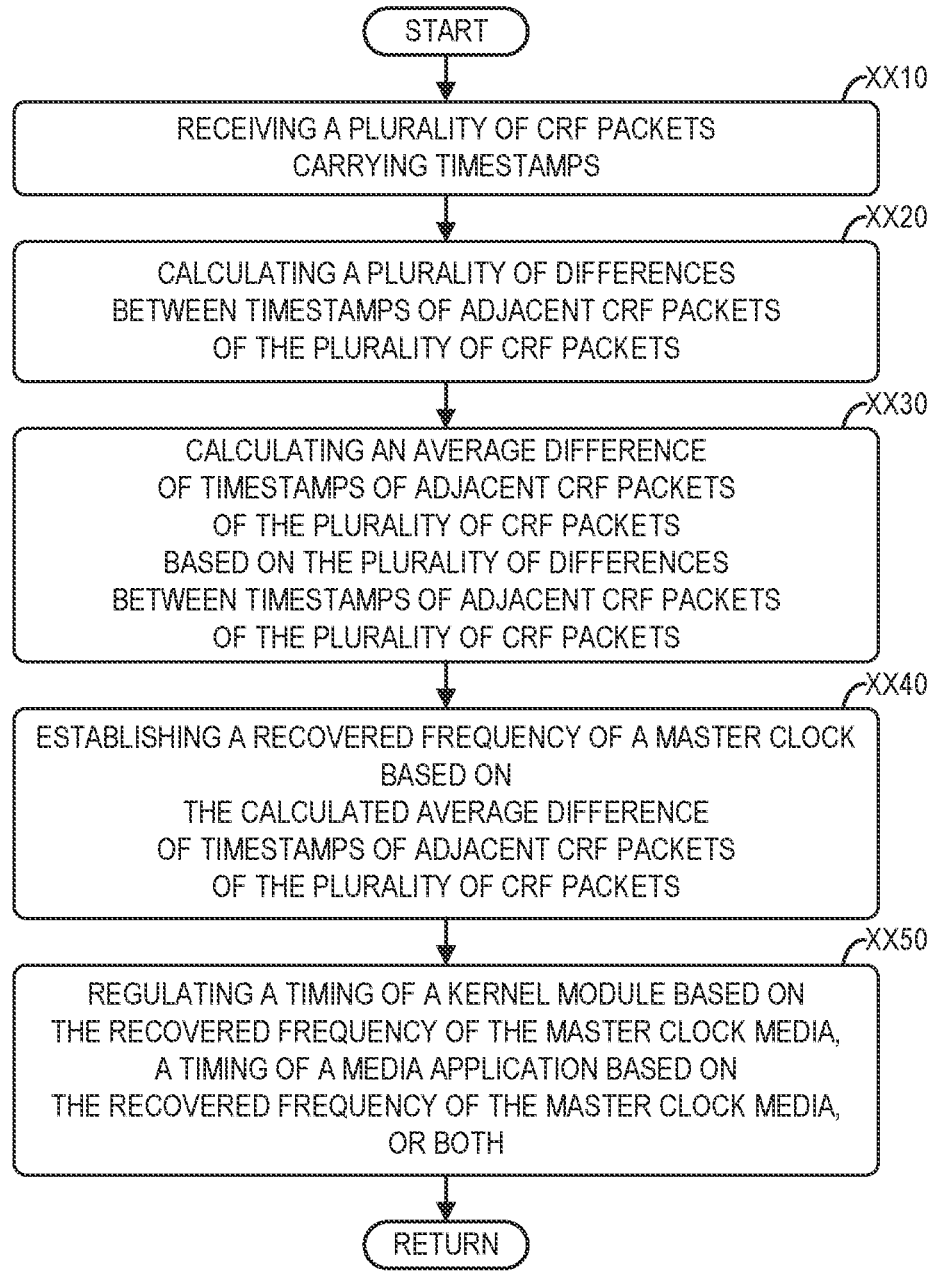
FIG. 7 shows a method for recovering a master media clock, in accordance with one or more embodiments of the present disclosure.

FIG. 7 shows a method for recovering a master media clock. A method 700 may comprise a receiving 710, a calculating 720, a calculating 730, and an establishing 740. In some embodiment, method 700 may include a regulating 750.

In various embodiments, in receiving 710, a plurality of CRF packets carrying timestamps may be received (e.g., at a device for consuming media packets). In calculating 720, a plurality of differences between timestamps of adjacent CRF packets of the plurality of CRF packets may be calculated. In calculating 730, an average difference of timestamps of adjacent CRF packets of the plurality of CRF packets, based on the plurality of differences between timestamps of adjacent CRF packets of the plurality of CRF packets. In 740, a recovered frequency of a master clock may be established based on the calculated average difference of timestamps of adjacent CRF packets of the plurality of CRF packets.

In some embodiments, the establishment of the recovered frequency of the master clock might not be based upon a PLL. For some embodiments, the device for consuming media packets may be at least part of an Ethernet audio/video bridging slave device. In some embodiments, the CRF packets may be in compliance with the IEEE 1722-2016 Standard for a Transport Protocol for Time-Sensitive Applications in Bridged Local Area Networks.

For some embodiments, the timestamps may be audio video transport protocol (AVTP) timestamps (Ts). In some embodiments, the plurality of CRF packets may be free of media data. For some embodiments, a difference between adjacent Ts may comprise a number of clock edge timestamps that have occurred between a transmitted CRF frame and a previously-transmitted CRF frame.

In some embodiments, in regulating 750, a timing of a kernel module may be regulated based on the recovered frequency of the master clock media, a timing of a media application based on the recovered frequency of the master clock media, or both. For some embodiments, the plurality of CRF packets may be part of a stream of CRF packets.

The methods may be configured for the operation of the systems disclosed herein. Thus, advantages that apply to the systems may apply to the methods, and advantages that apply to the methods may apply to the systems.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

FIG. 8 shows a system 800 for recovering a master media clock. System 800 may comprise a case 810, a power source 820, an interconnection board 830, one or more processors 840, one or more non-transitory memories 850, one or more input/output (I/O) interfaces 860, and/or one or more media drives 870.

Memories 850 may have executable instructions stored therein that, when executed, cause processors 840 to perform various operations, as disclosed herein. I/O interfaces 860 may include, for example, one or more interfaces for wired connections (e.g., Ethernet connections) and/or one or more interfaces for wireless connections (e.g., Wi-Fi and/or cellular connections).

System 800 (and/or other systems and devices disclosed herein) may be configured in accordance with the systems discussed herein. For example, system 800 may be employed in a protocols substantially similar to CRF packet processing protocol 200, PPS configuration protocol 300, MST generation protocol 400, receiving MST protocol 500, and/or MST generation and receiving protocol 600. In addition, system 800 may implement an architecture substantially similar to media service recovery architecture 102, and/or may undertake a method substantially similar to method 700. Thus, the same advantages that apply to these protocols, architectures, and methods discussed herein may apply to system 800.

FIG. 9 shows a system 900 for recovering a master media clock. System 900 may comprise a case 910, a power source 920, one or more processors 940, one or more memories 950, one or more antennas 960, and/or a display screen 980.

Memories 950 may have executable instructions stored therein that, when executed, cause processors 940 to perform various operations, as disclosed herein.

System 900 (and/or other systems and devices disclosed herein) may be configured in accordance with the systems discussed herein. For example, system 800 may be employed in a protocols substantially similar to CRF packet processing protocol 200, PPS configuration protocol 300, MST generation protocol 400, receiving MST protocol 500, and/or MST generation and receiving protocol 600. In addition, system 900 may implement an architecture substantially similar to media service recovery architecture 102, and/or may undertake a method substantially similar to method 700. Thus, the same advantages that apply to these protocols, architectures, and methods discussed herein may apply to system 900.

Note that the example protocols and methods included herein can be used with various audio processing system configurations. The control methods and routines disclosed herein may be stored as executable instructions in non-transitory memory and may be carried out by one or more processors. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The disclosure provides support for a system for recovering a master media clock, comprising: one or more processors, and a non-transitory memory having executable instructions that, when executed, cause the one or more processors to: receive a plurality of CRF packets carrying timestamps, calculate a plurality of differences between timestamps of adjacent CRF packets of the plurality of CRF packets, calculate an average difference of timestamps of adjacent CRF packets of the plurality of CRF packets, based on the plurality of differences between timestamps of adjacent CRF packets of the plurality of CRF packets, and establish a recovered frequency of a master clock based on the calculated average difference of timestamps of adjacent CRF packets of the plurality of CRF packets. In a first example of the system, the establishment of the recovered frequency of the master clock is not based upon a PLL. In a second example of the system, optionally including the first example, the system is at least part of an Ethernet audio/video bridging slave device. In a third example of the system, optionally including one or both of the first and second examples, the CRF packets are in compliance with the IEEE 1722-2016 Standard for a Transport Protocol for Time-Sensitive Applications in Bridged Local Area Networks. In a fourth example of the system, optionally including one or more or each of the first through third examples, the timestamps are AVTP Ts. In a fifth example of the system, optionally including one or more or each of the first through fourth examples, the plurality of CRF packets are free of media data, and wherein a difference between adjacent Ts comprises a number of clock edge timestamps that have occurred between a transmitted CRF frame and a previously-transmitted CRF frame. In a sixth example of the system, optionally including one or more or each of the first through fifth examples, the system further comprises: regulating a timing of a kernel module based on the recovered frequency of the master clock media, a timing of a media application based on the recovered frequency of the master clock media, or both. In a seventh example of the system, optionally including one or more or each of the first through sixth examples, the plurality of CRF packets are part of a stream of CRF packets.

The disclosure also provides support for a method for recovering a master media clock, comprising: receiving, at a device for consuming media packets, a plurality of CRF packets carrying timestamps, calculating a plurality of differences between timestamps of adjacent CRF packets of the plurality of CRF packets, calculating an average difference of timestamps of adjacent CRF packets of the plurality of CRF packets, based on the plurality of differences between timestamps of adjacent CRF packets of the plurality of CRF packets, and establishing a recovered frequency of a master clock based on the calculated average difference of timestamps of adjacent CRF packets of the plurality of CRF packets. In a first example of the method, the establishment of the recovered frequency of the master clock is not based upon a PLL. In a second example of the method, optionally including the first example, the device for consuming media packets is at least part of an Ethernet audio/video bridging slave device. In a third example of the method, optionally including one or both of the first and second examples, the CRF packets are in compliance with the IEEE 1722-2016 Standard for a Transport Protocol for Time-Sensitive Applications in Bridged Local Area Networks. In a fourth example of the method, optionally including one or more or each of the first through third examples, the timestamps are AVTP Ts. In a fifth example of the method, optionally including one or more or each of the first through fourth examples, the plurality of CRF packets are free of media data, and wherein a difference between adjacent Ts comprises a number of clock edge timestamps that have occurred between a transmitted CRF frame and a previously-transmitted CRF frame. In a sixth example of the method, optionally including one or more or each of the first through fifth examples, the method further comprises: regulating a timing of a kernel module based on the recovered frequency of the master clock media, a timing of a media application based on the recovered frequency of the master clock media, or both. In a seventh example of the method, optionally including one or more or each of the first through sixth examples, the plurality of CRF packets are part of a stream of CRF packets.

The disclosure also provides support for an Ethernet audio/video bridging slave device for recovering a master media clock, comprising: one or more processors, and a non-transitory memory having executable instructions that, when executed, cause the one or more processors to: calculate a plurality of differences between timestamps of adjacent CRF packets of a stream of CRF packets, calculate an average difference of timestamps of adjacent CRF packets of the plurality of CRF packets, based on the plurality of differences between timestamps of adjacent CRF packets of the plurality of CRF packets, and establish a recovered frequency of a master clock based on the calculated average difference of timestamps of adjacent CRF packets of the plurality of CRF packets, wherein the CRF packets are in compliance with the IEEE 1722-2016 Standard for a Transport Protocol for Time-Sensitive applications in Bridged Local area Networks. In a first example of the system, the CRF packets are in compliance with the IEEE 1722-2016 Standard for a Transport Protocol for Time-Sensitive Applications in Bridged Local Area Networks. In a second example of the system, optionally including the first example regulating a timing of a kernel module based on the recovered frequency of the master clock media, a timing of a media application based on the recovered frequency of the master clock media, or both. In a third example of the system, optionally including one or both of the first and second examples, the timestamps are AVTP Ts, wherein the plurality of CRF packets are free of media data, and wherein a difference between adjacent Ts comprises a number of clock edge timestamps that have occurred between a transmitted CRF frame and a previously-transmitted CRF frame.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for recovering a master media clock that is different from a clock of a device consuming output from a media master device, comprising:
   one or more processors; and
   a non-transitory memory having executable instructions that, when executed, cause the one or more processors to:
   receive a plurality of clock reference format (CRF) packets carrying timestamps;
   calculate a plurality of differences between timestamps carried by adjacent CRF packets of the plurality of CRF packets;
   calculate an average difference of timestamps carried by adjacent CRF packets of the plurality of CRF packets, based on the plurality of differences between timestamps carried by adjacent CRF packets of the plurality of CRF packets; and
   establish a recovered frequency of the master media clock based on the calculated average difference of timestamps carried by adjacent CRF packets of the plurality of CRF packets.

2. The system for recovering a master media clock of claim 1, wherein the establishment of the recovered frequency of the master media clock is not based upon a phase locked loop (PLL).

3. The system for recovering a master media clock of claim 1, wherein the system is at least part of an Ethernet audio/video bridging slave device.

4. The system for recovering a master media clock of claim 3, wherein the plurality of CRF packets are in compliance with the IEEE 1722-2016 Standard for a Transport Protocol for Time-Sensitive Applications in Bridged Local Area Networks.

5. The system for recovering a master media clock of claim 4, wherein the plurality of CRF packets are free of media data, and wherein a difference between adjacent Ts comprises a number of clock edge timestamps that have occurred between a transmitted CRF frame and a previously-transmitted CRF frame.

6. The system for recovering a master media clock of claim 1, wherein the timestamps are audio video transport protocol (AVTP) timestamps (Ts).

7. The system for recovering a master media clock of claim 1, further comprising:
regulating a timing of a kernel module based on the recovered frequency of the master media clock, a timing of a media application based on the recovered frequency of the master media clock, or both.

8. The system for recovering a master media clock of claim 1, wherein the plurality of CRF packets are part of a stream of CRF packets.

9. A method for recovering a master media clock that is different from a clock of a device for consuming media packets, comprising:
receiving, at the device for consuming media packets, a plurality of clock reference format (CRF) packets carrying timestamps;
calculating, using the device for consuming media packets, a plurality of differences between timestamps carried by adjacent CRF packets of the plurality of CRF packets;
calculating, using the device for consuming media packets, an average difference of timestamps carried by adjacent CRF packets of the plurality of CRF packets, based on the plurality of differences between timestamps carried by adjacent CRF packets of the plurality of CRF packets; and
establishing, using the device for consuming media packets, a recovered frequency of the master media clock based on the calculated average difference of timestamps carried by adjacent CRF packets of the plurality of CRF packets.

10. The method for recovering a master media clock of claim 9, wherein the establishment of the recovered frequency of the master media clock is not based upon a phase locked loop (PLL).

11. The method for recovering a master media clock of claim 9, wherein the device for consuming media packets is at least part of an Ethernet audio/video bridging slave device.

12. The method for recovering a master media clock of claim 9, wherein the plurality of CRF packets are in compliance with the IEEE 1722-2016 Standard for a Transport Protocol for Time-Sensitive Applications in Bridged Local Area Networks.

13. The method for recovering a master media clock of claim 9, wherein the timestamps are audio video transport protocol (AVTP) timestamps (Ts).

14. The method for recovering a master media clock of claim 13, wherein the plurality of CRF packets are free of media data, and wherein a difference between adjacent Ts comprises a number of clock edge timestamps that have occurred between a transmitted CRF frame and a previously-transmitted CRF frame.

15. The method for recovering a master media clock of claim 9, further comprising:
regulating a timing of a kernel module based on the recovered frequency of the master media clock, a timing of a media application based on the recovered frequency of the master media clock, or both.

16. The method for recovering a master media clock of claim 9, wherein the plurality of CRF packets are part of a stream of CRF packets.

17. An Ethernet audio/video bridging slave device for recovering a master media clock that is different from a clock of the Ethernet audio/video bridging slave device, comprising:
one or more processors; and
a non-transitory memory having executable instructions that, when executed, cause the one or more processors to:
calculate a plurality of differences between timestamps carried by adjacent clock reference format (CRF) packets of a stream of CRF packets;
calculate an average difference of timestamps carried by adjacent CRF packets of the stream of CRF packets, based on the plurality of differences between timestamps carried by adjacent CRF packets of the stream of CRF packets; and
establish a recovered frequency of the master media clock based on the calculated average difference of timestamps carried by adjacent CRF packets of the stream of CRF packets,
wherein the stream of CRF packets are in compliance with the IEEE 1722-2016 Standard for a Transport Protocol for Time-Sensitive Applications in Bridged Local Area Networks.

18. The Ethernet audio/video bridging slave device for recovering a master media clock of claim 17, wherein the timestamps are audio video transport protocol (AVTP) timestamps (Ts).

19. The Ethernet audio/video bridging slave device for recovering a master media clock of claim 18, wherein the stream of CRF packets are free of media data, and wherein a difference between adjacent Ts comprises a number of clock edge timestamps that have occurred between a transmitted CRF frame and a previously-transmitted CRF frame.

20. The Ethernet audio/video bridging slave device for recovering a master media clock of claim 17, regulating a timing of a kernel module based on the recovered frequency of the master media clock, a timing of a media application based on the recovered frequency of the master media clock, or both.

* * * * *